(12) United States Patent
Chen et al.

(10) Patent No.: US 10,311,743 B2
(45) Date of Patent: Jun. 4, 2019

(54) SYSTEMS AND METHODS FOR PROVIDING A MULTI-MODAL EVALUATION OF A PRESENTATION

(71) Applicant: Educational Testing Service, Princeton, NJ (US)

(72) Inventors: Lei Chen, Pennington, NJ (US); Gary Feng, Princeton, NJ (US); Chee Wee Leong, Levittown, PA (US); Christopher Kitchen, Princeton, NJ (US); Chong Min Lee, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 406 days.

(21) Appl. No.: 14/247,757

(22) Filed: Apr. 8, 2014

(65) Prior Publication Data

US 2014/0302469 A1  Oct. 9, 2014

Related U.S. Application Data

(60) Provisional application No. 61/809,443, filed on Apr. 8, 2013.

(51) Int. Cl.
*G09B 19/00* (2006.01)

(52) U.S. Cl.
CPC ................. *G09B 19/00* (2013.01)

(58) Field of Classification Search
CPC ... G10L 15/22; G10L 15/26; G06F 17/30654; G09B 19/00; G09B 19/04
USPC ........................................................ 434/236
See application file for complete search history.

(56) References Cited

U.S. PATENT DOCUMENTS

| 2003/0202007 | A1 | 10/2003 | Silverstein et al. |
| 2005/0171926 | A1* | 8/2005 | Thione ............... G10L 15/22 |
| 2014/0132505 | A1* | 5/2014 | Vennelakanti ......... G06F 3/017 345/156 |

OTHER PUBLICATIONS

Essid, Slim, Alexiadis, Dimitrios, Tournemenne, Robin, Gowing, Marc; Kelly, Philip, Monaghan, David, Daras, Petros, Dremeau, Angelique, O'Conner, Noel; An Advanced Virtual Dance Performance Evaluator; 2012 IEEE International Conference on Acoustics, Speech and Signal Processing; pp. 2269-2272; Mar. 2012.
Fanelli, Gabriele, Gall, Juergen, Van Gool, Luc; Real Time Head Pose Estimation with Random Regression Forests; 2011 IEEE Conference on Computer Vision and Pattern Recognition; pp. 617-624; Jun. 2011.

(Continued)

*Primary Examiner* — Jerry-Daryl Fletcher
(74) *Attorney, Agent, or Firm* — Jones Day

(57) ABSTRACT

Systems and methods are described for providing a multi-modal evaluation of a presentation. A system includes a motion capture device configured to detect motion an examinee giving a presentation and an audio recording device configured to capture audio of the examinee giving the presentation. One or more data processors are configured to extract a non-verbal feature of the presentation based on data collected by the motion capture device and an audio feature of the presentation based on data collected by the audio recording device. The one or more data processors are further configured to generate a presentation score based on the non-verbal feature and the audio feature.

16 Claims, 7 Drawing Sheets

(56) References Cited

OTHER PUBLICATIONS

Funes Mora, Kenneth Alberto, Odobez, Jean-Marc; Gaze Estimation from Multimodal Kinect Data; 2012 IEEE Computer Society Conference on Computer Vision and Pattern Recognition Workshops; pp. 25-30; Jun. 2012.
Grafsgaard, Joseph F., Boyer, Kristy Elizabeth, Wiebe, Eric N., Lester, James C.; Analyzing Posture and Affect in Task-Oriented Tutoring; Proceedings of the 25th International Florida Artificial Intelligence Research Society Conference; pp. 438-443; 2012.
Kendon, Adam; Gesture: Visible Action as Utterance; Cambridge University Press; 2004.
Kipp, Michael; Multimedia Annotation, Querying and Analysis in ANVIL; Ch. 19 in Multimedia Information Extraction, M. Maybury (Ed.); Wiley-IEEE Computer Society Press; Sep. 2012.
Kusmierczyk, Ewa; English-Background and Non-English-Background Speakers' Perceptions of Gaze and Bodily Movements in Academic Interactions; University of Sydney Papers in TESOL, 6; pp. 71-96; 2011.
McNeill, David; Language and Gesture; University of Chicago Press; 2000.
Swift, Mary; Ferguson, George, Galescu, Lucian, Chu, Yi, Harman, Craig, Jung, Hyuckchul; Perera, Ian, Song, Young Chol, Allen, James, Kautz, Henry; A Multimodal Corpus for Integrated Langauage and Action; Proceedings of the International Workshop on Multimodal Corpora for Machine Learning; 2012.
Wiggins, Grant; Educative Assessment: Designing Assessments to Inform and Improve Student Performance; Jossey-Bass Publishers: San Francisco, CA; 1998.
Zhang, Zhengyou; Microsoft Kinect Sensor and Its Effect; IEEE MultiMedia, 19(2); pp. 4-10; 2012.
Ahn, Sun Joo, Bailenson, Jeremy, Fox, Jesse, Jabon, Maria; Using Automated Facial Expression Analysis for Emotion and Behavior Prediction; Ch. 20 in The Routledge Handbook of Emotions and Mass Media; pp. 349-369; 2010.
Batrinca, Ligia, Stratou, Giota, Shapiro, Ari, Morency, Louis-Philippe, Scherer, Stefan; Cicero—Towards a Multimodal Virtual Audience Platform for Public Speaking Training; Lecture Notes in Computer Science, 8108; pp. 116-128; 2013.
Bradski, Gary; The OpenCV Library; Dr. Dobb's Journal of Software Tools; 2000.
Eyben, Florian, Wollmer, Martin, Schuller, Bjorn; openSMILE—The Munich Versatile and Fast Open-Source Audio Feature Extractor; Proceedings of ACM Multimedia, 10; pp. 1459-1462; 2010.
Goldin-Meadow, Susan, McNeill, David, Singleton, Jenny; Silence Is Liberating: Removing the Handcuffs on Grammatical Expression in the Manual Modality; Psychological Review, 103(1); pp. 34-55; 1996.
Goldin-Meadow, Susan; Hearing Gesture: How Our Hands Help Us Think; Belknap Press; 2005.
Gonzalez-Sanchez, Javier, Christopherson, Robert, Chavez-Echeagaray, Maria Elena, Gibson, David, Atkinson, Robert, Burleson, Winslow; How To Do Multimodal Detection of Affective States?; 11th IEEE International Conference on Advanced Learning Technologies; pp. 654-655; 2011.
Kurihara, Kazutaka, Goto, Masataka, Ogata, Jun, Matsusaka, Yosuke, Igarashi, Takeo; Presentation Sensei: A Presentation Training System Using Speech and Image Processing; Proceedings of the 9th International Conference on Multimodal Interfaces; pp. 358-365; 2007.
Laukka, Petri, Linnman, Clas, Ahs, Fredrik, Pissiota, Anna, Frans, Orjan, Faria, Vanda, Michaelgard, Asa, Appel, Lieuwe, Fredrikson, Mats, Furmark, Tomas; In a Nervous Voice: Acoustic Analysis and Perception of Anciety in Social Phobics' Speech; Journal of Nonverbal Behavior, 32; pp. 195-214; 2008.
Mayberry, Rachel, Jaques, Joselynne; Gesture Production During Stuttered Speech: Insights Into the Nature of Gesture-Speech Integration; Language and Gesture, 2; pp. 199-214; 2000.
McNeill, David; Gesture and Thought; University of Chicago Press; 2005.
Nguyen, Anh-Tuan, Chen, Wei, Rauterberg, Matthias; Online Feedback System for Public Speakers; IEEE Symposium on E-Learning, E-Management and E-Services; 2012.
Risbrough, Victoria; Behavioral Correlates of Anxiety; In Behavioral Neurobiology of Anxiety and Its Treatment, M. Stein & T. Steckler (Eds.); Springer-Verlag; Heidelberg, Germany; pp. 205-228; 2010.
Shriberg, Elizabeth; To 'errrr' is Human: Ecology and Acoustics of Speech Disfluencies; Journal of the International Phonetic Association, 31(1); pp. 153-169; 2001.
Vinciarelli, Alessandro, Pantic, Maja, Bourlard, Herve; Social Signal Processing: Survey of an Emerging Domain; Image and Vision Computing, 27(12); pp. 1743-1759; 2009.
Yildirim, Serdar, Narayanan, Shrikanth; Automatic Detection of Disfluency Boundaries in Spontaneous Speech of Children Using Audio-Visual Information; IEEE Transactions on Audio, Speech, and Language Processing, 17(1); pp. 2-12; 2009.
Beatty, Michael, Behnke, Ralph; Effects of Public Speaking Trait Anxiety and Intensity of Speaking Task on Heart Rate During Performance; Human Communication Research, 18(2); pp. 147-176; 1991.
Behnke, Ralph, Sawyer, Chris; Milestones of Anticipatory Public Speaking Anxiety; Communication Education, 48(2); pp. 165-172; 1999.
Behnke, Ralph, Sawyer, Chris; Anticipatory Anxiety Patterns for Male and Female Public Speakers; Communication Education, 49(2); pp. 187-195; 2000.
Cristani, Marco, Raghavendra, R., Del Bue, Alessio, Murino, Vittorio; Human Behavior Analysis in Video Surveillance: A Social Signal Processing Perspective; Neurocomputing, 100; pp. 86-97; 2013.
Fasel, B., Luettin, Juergen; Automatic Facial Expression Analysis: A Survey; Pattern Recognition, 36(1); pp. 259-275; 2003.
Hancock, Dawson; Effects of Performance Assessment on the Achievement and Motivation of Graduate Students; Active Learning in Higher Education, 8(3); pp. 219-231; 2007.
Hirshfeld, Dina, Rosenbaum, Jerrold, Biederman, Joseph, Bolduc, Elizabeth Faraone, Stephen, Snidman, Nancy, Reznick, Steven, Kagan, Jerome; Stable Behavioral Inhibition and Its Association with Anxiety Disorder; Journal of the American Academy of Chile & Adolescent Psychiatry, 31(1); pp. 103-111; 1992.
Jenkins, Susan, Parra, Isabel; Multiple Layers of Meaning in an Oral Proficiency Test: The Complementary Roles of Nonverbal, Paralinguistic, and Verbal Behaviors in Assessment Decisions; The Modern Language Journal, 87(1); pp. 90-107; 2003.
Messick, Samuel; The Interplay of Evidence and Consequences in the Validity of Performance Assessments; Educational Researcher, 23(2); pp. 13-23; 1994.
Phillips, Lowana; A Study of the Impact of Foreign Language Anxiety on Tertiary Students' Oral Performance; Postgraduate Thesis, University of Hong Kong; 2005.
Pull, Charles; Current Status of Knowledge on Public-Speaking Anxiety; Current Opinion in Psychiatry, 25(1); pp. 32-38; 2012.
Sawyer, Chris, Behnke, Ralph; State Anxiety Patterns for Public Speaking and the Behavior Inhibition System; Communication Reports, 12(1); pp. 33-41; 1999.

* cited by examiner

SYSTEMS AND METHODS FOR PROVIDING A MULTI-MODAL EVALUATION OF A PRESENTATION

CROSS-REFERENCE TO RELATED APPLICATIONS

The present application claims priority from U.S. Provisional Application Ser. No. 61/809,443 entitled "Using Multi-Modal Cues to Score Presentation-Making Skills," filed 8 Apr. 2013, the entirety of which is hereby incorporated by reference.

FIELD

This disclosure is related generally to presentation evaluation and more particularly to presentation evaluation using non-verbal features.

BACKGROUND

While limited-choice selection items have historically been used for evaluating abilities of a person, the amount of insight into those abilities that can be gained through the use of such testing items is limited. Such evaluation items have been used in large part due to the ease in scoring those item types. Given an ability to ease the scoring burden of more advanced item types, such advanced item types will be used more frequently, providing enhanced information on abilities of an examinee. For example, when investigating an examinee's communication ability (e.g., in evaluating progress in language learning, in evaluating teaching ability, in evaluating job aptitude as part of an interview process) it may be desirable to analyze the examinee's presentation abilities with some automatic scoring of those abilities being provided.

SUMMARY

Systems and methods are described for providing a multi-modal evaluation of a presentation. A system includes a motion capture device configured to detect motion of an examinee giving a presentation and an audio recording device configured to capture audio of the examinee giving the presentation. One or more data processors are configured to extract a non-verbal feature of the presentation based on data collected by the motion capture device and an audio feature of the presentation based on data collected by the audio recording device. The one or more data processors are further configured to generate a presentation score based on the non-verbal feature and the audio feature.

As another example, a computer-implemented method of providing a multi-modal evaluation of a presentation includes detecting motion of an examinee giving a presentation using a motion capture device and capturing audio of the examinee giving the presentation using an audio recording device. A non-verbal feature of the presentation is extracted based on data collected by the motion capture device, and an audio feature of the presentation is extracted based on data collected by the audio recording device. A presentation score is generated based on the non-verbal feature and the audio feature.

As a further example, one or more computer-readable mediums are encoded with instructions for commanding one or more data processors to execute steps of a method of providing a multi-modal evaluation of a presentation that includes detecting motion of an examinee giving a presentation using a motion capture device and capturing audio of the examinee giving the presentation using an audio recording device. A non-verbal feature of the presentation is extracted based on data collected by the motion capture device, and an audio feature of the presentation is extracted based on data collected by the audio recording device. A presentation score is generated based on the non-verbal feature and the audio feature.

DETAILED DESCRIPTION

Presentations have long been used not only as a mechanism for conveying information but as a mechanism for measuring abilities of a person giving the presentation. For example, presentations are often required as part of a schooling program (e.g., an oral book report) to measure the examinee's substantive and/or presentation abilities. Such evaluations can be useful in many other circumstances as well. For example, as part of a teaching certification process, student-teachers are often asked to present a short lecture on a topic with little preparation time. In another example, students in an English-as-a-Second-Language program may be asked to speak on a topic to evaluate their communicative abilities in the English language. In a further example, communication skills during an interview are examined, especially for jobs, such as public relations positions, that require strong communication abilities.

Such presentation examinations have traditionally been human-scored, such as by an evaluator watching the presentation live. Such scoring is time consuming and expensive, but presentation evaluations have been consistently used because of the level of information that they are able to provide about examinee abilities. Systems and methods are described herein for providing an automated, multi-modal evaluation of presentations that can enable more widespread use of presentation evaluations without significant increase in costs and other difficulties encountered in manual-scored presentation evaluations (e.g., bias of scorers). For example, such automatic scores could be utilized as a partial first round filter of interviewees for a job position having a large number of applicants.

Figure 1:
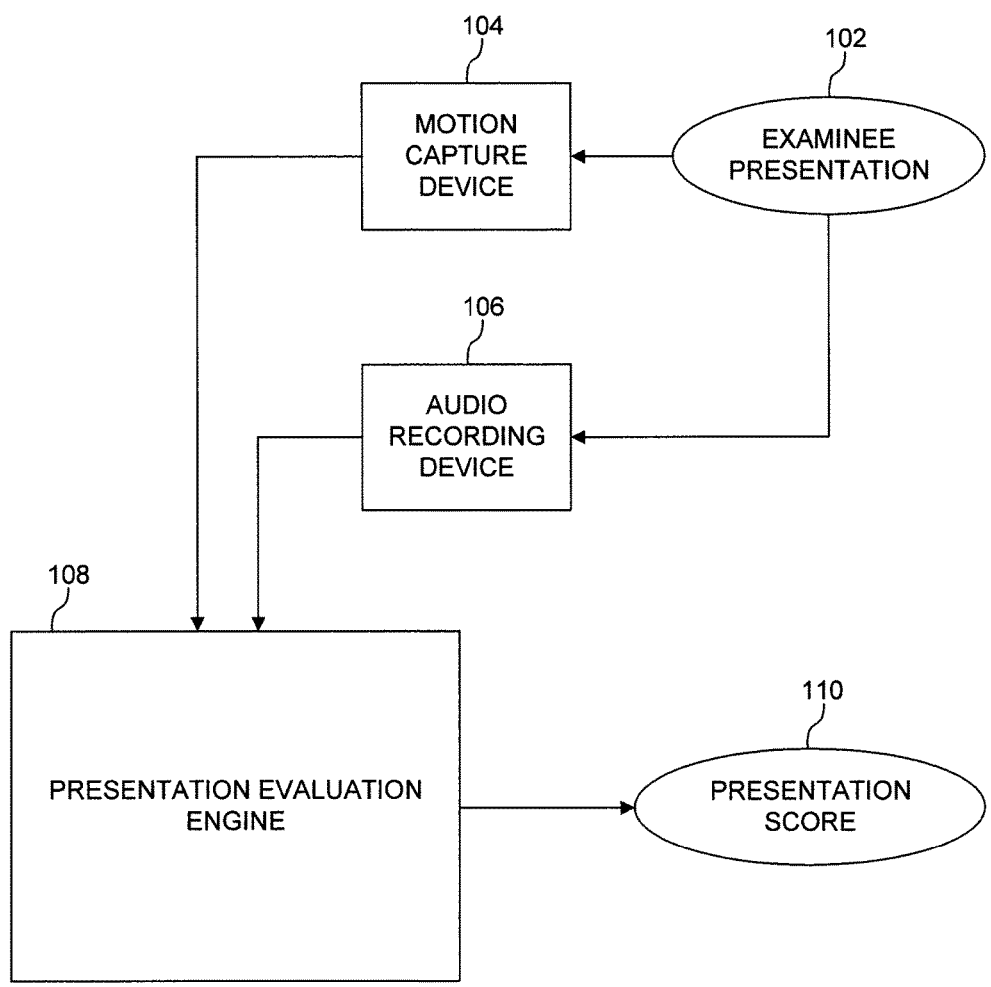
FIG. 1 is a block diagram depicting a presentation evaluation engine for providing a multi-modal evaluation of a presentation.

FIG. 1 is a block diagram depicting a presentation evaluation engine for providing a multi-modal evaluation of a presentation. An examinee presentation 102 is viewed by a motion capture device 104 configured to detect motion of the examinee giving the presentation 102. An audio recording device 106 is configured to capture audio of the examinee giving the presentation. Outputs from the motion capture device 104 and the audio recording device 106 are provided to a presentation evaluation engine 108. Based on those outputs, the presentation evaluation engine 108 is configured to generate a presentation score 110.

Figure 2:
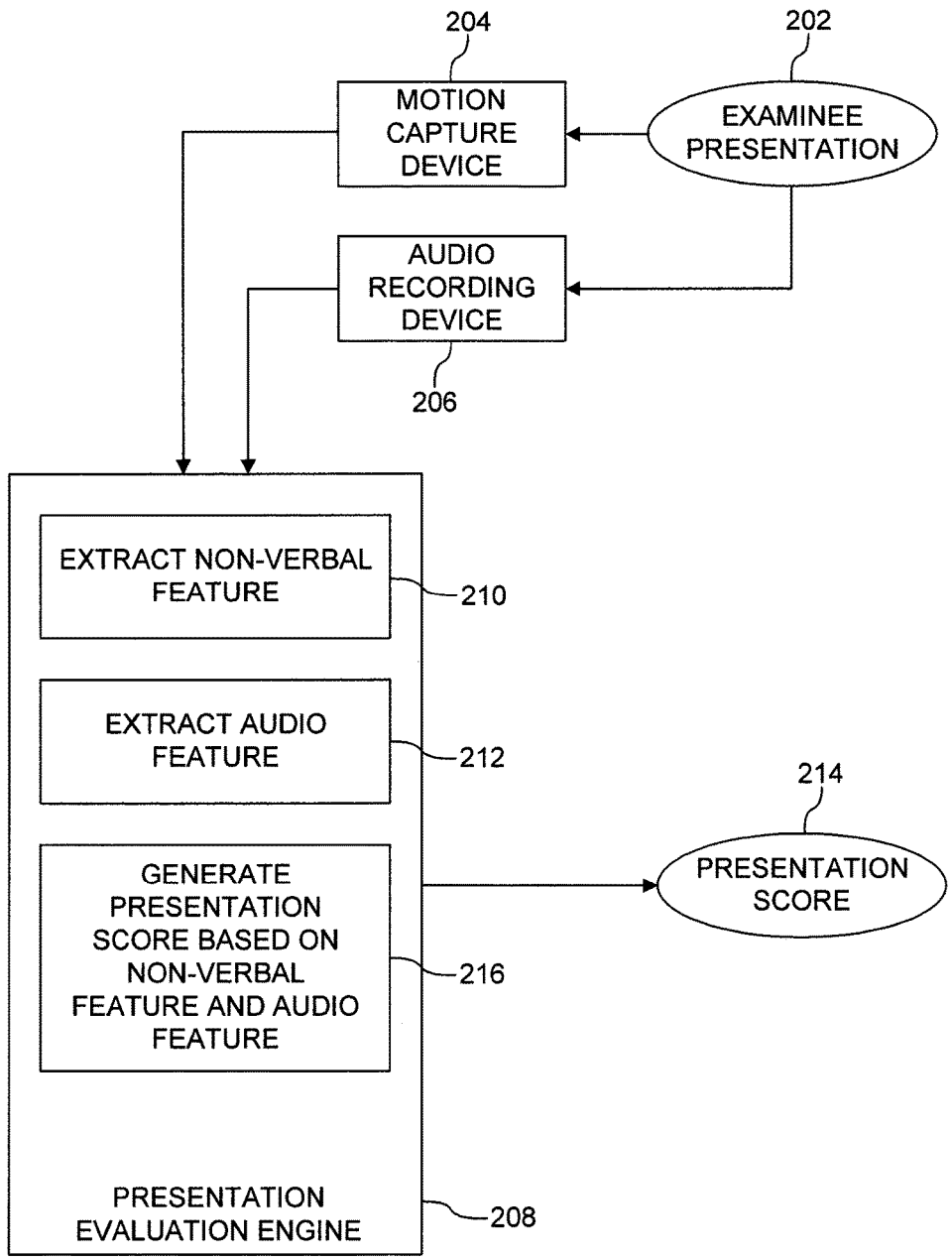
FIG. 2 is a block diagram depicting operations of a presentation evaluation engine.

FIG. 2 is a block diagram depicting operations of a presentation evaluation engine. Similar to the example of FIG. 1, an examinee presentation 202 is viewed by a motion capture device 204 configured to detect motion of the examinee giving the presentation 202. An audio recording device 206 is configured to capture audio of the examinee giving the presentation. Outputs from the motion capture device 204 and the audio recording device 206 are provided to a presentation evaluation engine 208.

The presentation evaluation engine 208 includes one or more data processors that are configured to extract a non-verbal feature of the presentation 202 at 210 based on data collected by the motion capture device 204 and to extract an audio feature of the presentation at 212 based on data collected by the audio recording device 206. The presentation evaluation engine 208 is further configured to generate a presentation score 214 at 216 based on the non-verbal feature and the audio feature.

Figure 3:
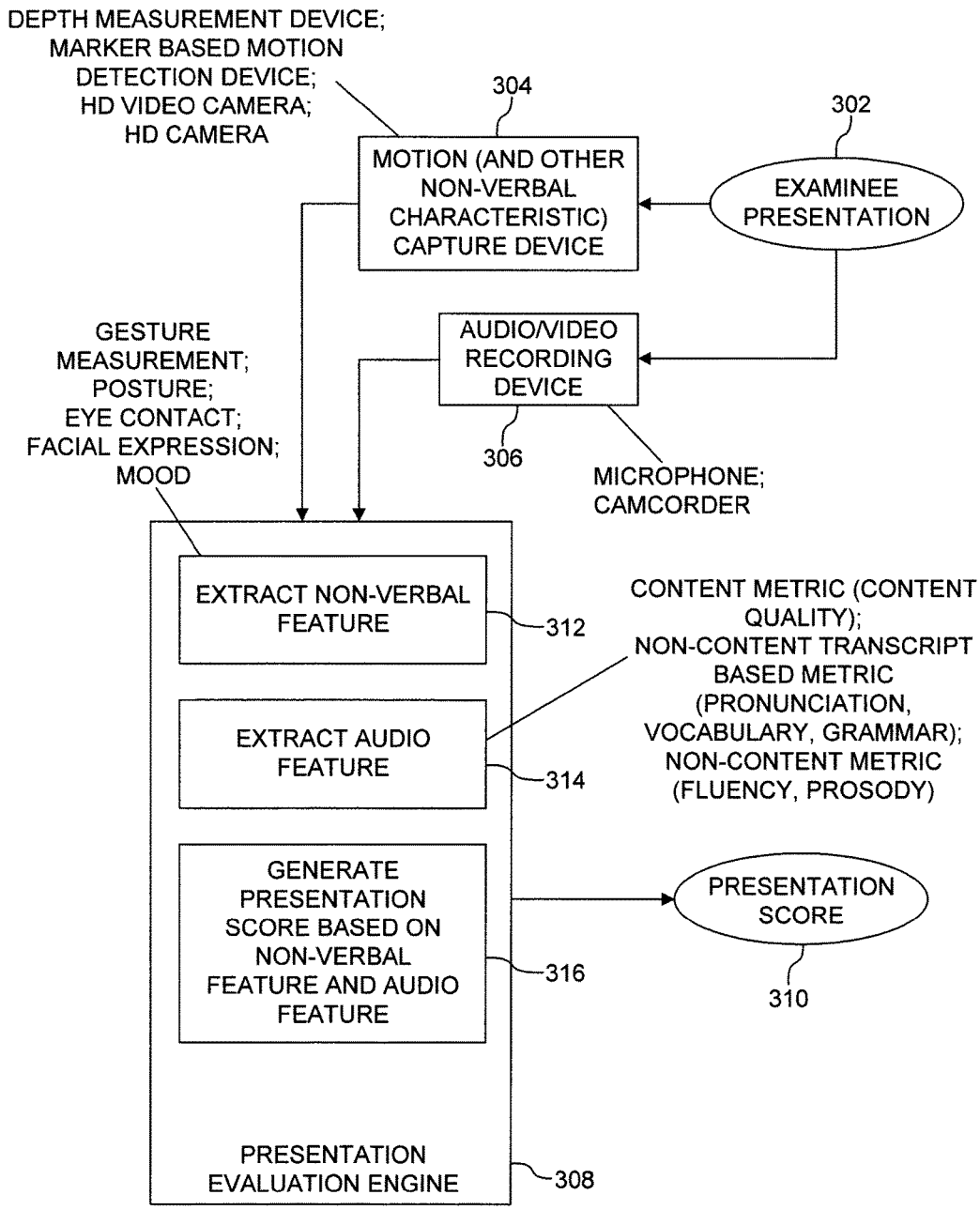
FIG. 3 is a block diagram depicting example components used in implementing a presentation evaluation engine.

FIG. 3 is a block diagram depicting example components used in implementing a presentation evaluation engine. Motion from an examinee presentation 302 is detected by a motion capture device 304 (e.g., digital values, voltages, video imagery). In one example, the motion capture device is a depth measurement device (e.g., a Microsoft Kinect device) that captures measurements of the distance of objects from a sensor (e.g., a digital depth measurement value for each pixel of an array of pixels) and thus, depth information that can be utilized to analyze motion of the presenter. In another example, the motion capture device 304 is a video camera (e.g., a high-definition video camera), where marker based motion capture is performed based on anchor points identified at certain positions of the examinee. As those anchor points move from frame-to-frame of captured video, motion measurements can be measured. In another example, the video camera is utilized to measure facial expressions and changes in facial expressions throughout the presentation. An audio recording device 306, such as in the form of a microphone, is configured to capture audio of the examinee presentation 308 for downstream processing. In one example, the audio of the examinee presentation 302 is captured using a microphone of a device, such as a camcorder, that is also acting as the motion capture device, as illustrated at 306.

Outputs of the motion capture device 304 and the audio recording device 306 are provided to a presentation evaluation engine 308 for processing and downstream generation of a presentation score 310. At 312, the presentation evaluation engine 308 extracts one or more non-verbal features that are used in the generation of the presentation score 310. For example, occurrence, frequency, and speed of body movement, gestures, eye movement, head turning, etc., can be determined by the processing system, such as from successive frames of captured video imagery using suitable image processing methods including conventional image processing methods and algorithms. Non-verbal features that could be extracted at 310 include gesture metrics (e.g., amount of gesturing, speed of gesturing) as indicated by data from the motion capture device. For example, depth measurements from the motion capture device 304 could be used to track and determine an amount of hand gesturing during the examinee presentation. In another example, magnitudes of pixel value changes or rates of change of pixel value changes between frames of a video could indicate an amount of movement of the examinee and, thus, their level of gesticulation. As another example, a non-verbal posture (or head position/orientation) feature could be generated based on analysis of video footage of the examinee presentation. For example, changes in relative distances among anchor points on the examinee during the presentation could indicate slouching at certain portions of the presentation. As a further example, eye contact and facial expression metrics could be extracted, such as through analysis of high-definition video taken during the presentation, which indicate demeanor of the presenter and appropriateness of eye contact. Other non-verbal features, such as mood, could be extracted. For example, a combination of a gesture sub-feature and a posture sub-feature could be referenced to determine a mood feature, where an alert posture with fast gestures indicates an angry or agitated mood, while low movement and poor posture could indicate a self-conscious mood.

At 314, the presentation evaluation engine 308 extracts one or more audio features using data from the audio recording device 306. Audio features utilized by the presentation evaluation engine 308 may be content based features or non-content based features. For example, an audio feature may measure a quality of content spoken by the examinee in the presentation 302. In such an example, the presentation audio is provided to an automatic speech recognizer that generates a transcript of the presentation 302. To analyze the content of the presentation 302, the transcript can be compared to other model transcripts, compared to a prompt presented to the examinee to set up the presentation, or another constructed response scoring technique can be used, such as techniques that use natural language processing or latent semantic analysis to compare texts. Certain non-content based audio features can utilize a transcript (e.g., an automatic speech recognizer transcript or a manual transcript) to generate an audio feature. For example, an audio feature could measure pronunciation of words in the presentation 302 by comparing sounds produced by the presenter at certain points of the presentation, as captured by the audio recording device 306, and proper pronunciations of words identified at those points in the transcript. Other non-content transcript based metrics could indicate levels of vocabulary and grammar used in the presentation 302. Other non-content, delivery-type metrics can be determined without use of a transcript (although an automatic speech recognizer may still be used to generate the metrics). For example, fluency and prosody can be measured by observing stresses, accents, and discontinuities (e.g., pauses, hesitations, use of filler words, false starts, repetitions) in audio captured of the presentation 302.

One or more non-verbal features and/or one or more audio features can be combined to generate a presentation score at 316. For example, the features 312, 314 can be weighted to generate a presentation score, where such weights can be generated through analysis of human scored presentations, where such analysis indicates correlations between features of presentations and human scores for those presentations.

Figure 4:
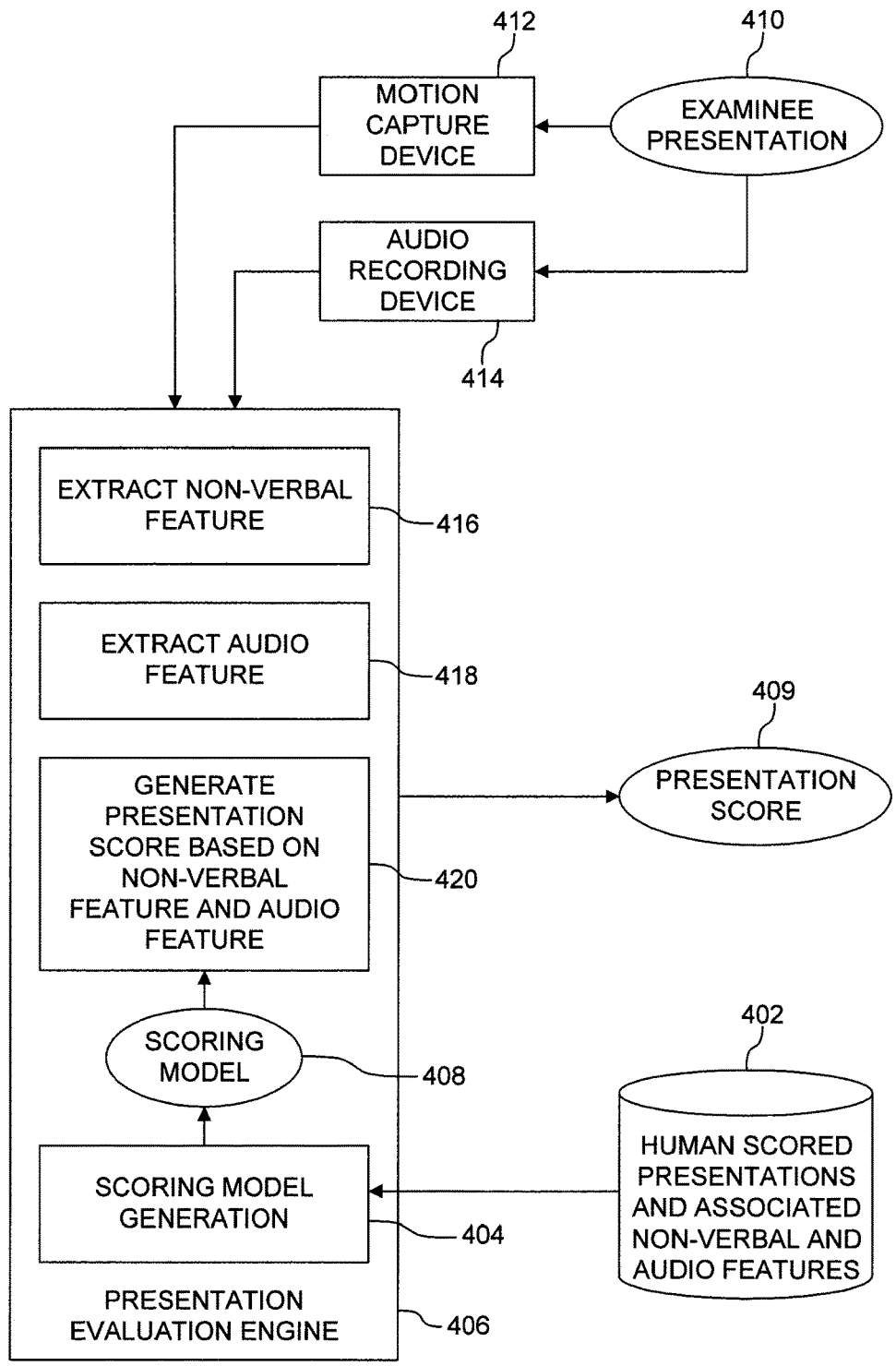
FIG. 4 is a block diagram depicting generation of a scoring model for use in generating presentation scores.

FIG. 4 is a block diagram depicting generation of a scoring model for use in generating presentation scores. A collection of human scored presentations are assembled, such as in a computer-readable data store 402 that contains the human scores and a variety of different non-verbal and audio features of those presentations. A scoring model generation module 404 of a presentation evaluation engine 406 performs an analysis of the human scored presentations to determine which non-verbal and audio features are predictive of human scores. For example, the scoring model generation module 404 may identify correlations between non-verbal and audio features and the assigned human score to select features that are predictive and weight those features accordingly. The identified features (e.g., multiple non-verbal features and multiple audio features) and their associated weights are stored as a scoring model 408 that is utilized for generating presentation scores 409 for other examinee presentations 412. An examinee presentation 410 is viewed by a motion capture device 412 configured to detect motion of the examinee giving the presentation 410. An audio recording device 414 is configured to capture audio of the examinee giving the presentation. Outputs from the motion capture device 412 and the audio recording device 414 are provided to the presentation evaluation engine 406.

The presentation evaluation engine 406 includes one or more data processors that are configured to extract a non-verbal feature of the presentation 410 at 416 based on data collected by the motion capture device 412, such as the non-verbal features identified for use by the scoring model 408 because of the predictiveness of human scores. At 418, the presentation evaluation engine 406 extracts an audio feature of the presentation at 410 based on data collected by the audio recording device 414. The presentation evaluation engine 406 is configured to generate the presentation score 409 at 420 based on the non-verbal feature and the audio feature as instructed by the scoring model 408.

Figure 5:
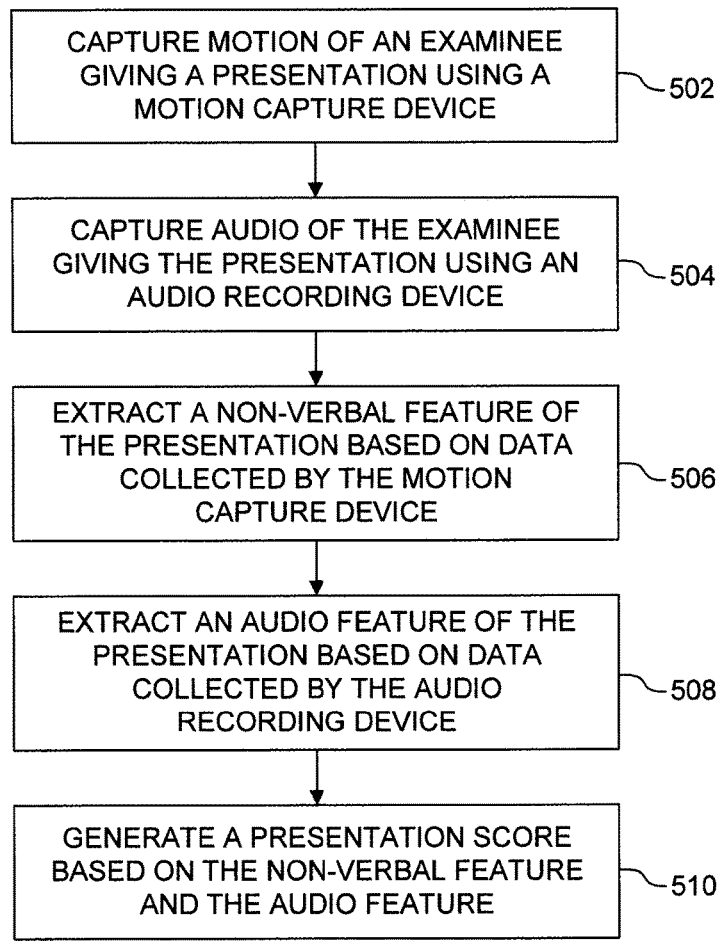
FIG. 5 is a flow diagram depicting a computer-implemented method of providing a multi-modal evaluation of a presentation.

FIG. 5 is a flow diagram depicting a computer-implemented method of providing a multi-modal evaluation of a presentation. The method includes detecting motion of an examinee giving a presentation using a motion capture device at 502 and capturing audio of the examinee giving the presentation using an audio recording device at 504. A non-verbal feature of the presentation is extracted based on data collected by the motion capture device at 506, and an audio feature of the presentation is extracted based on data collected by the audio recording device at 508. At 510, a presentation score is generated based on the non-verbal feature and the audio feature.

Figure 6A:
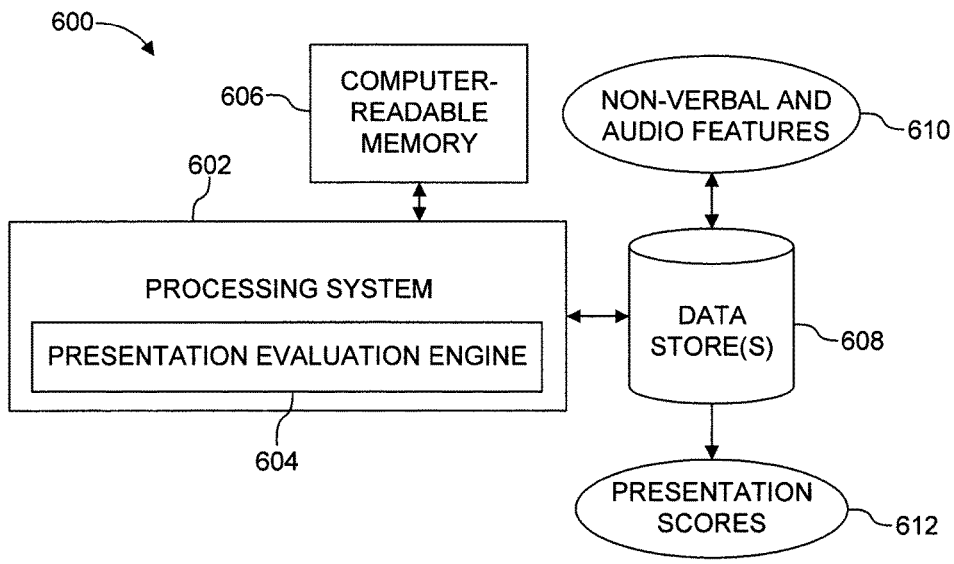
FIGS. 6A, 6B, and 6C depict example systems for use in implementing a presentation evaluation engine.
Figure 6B:
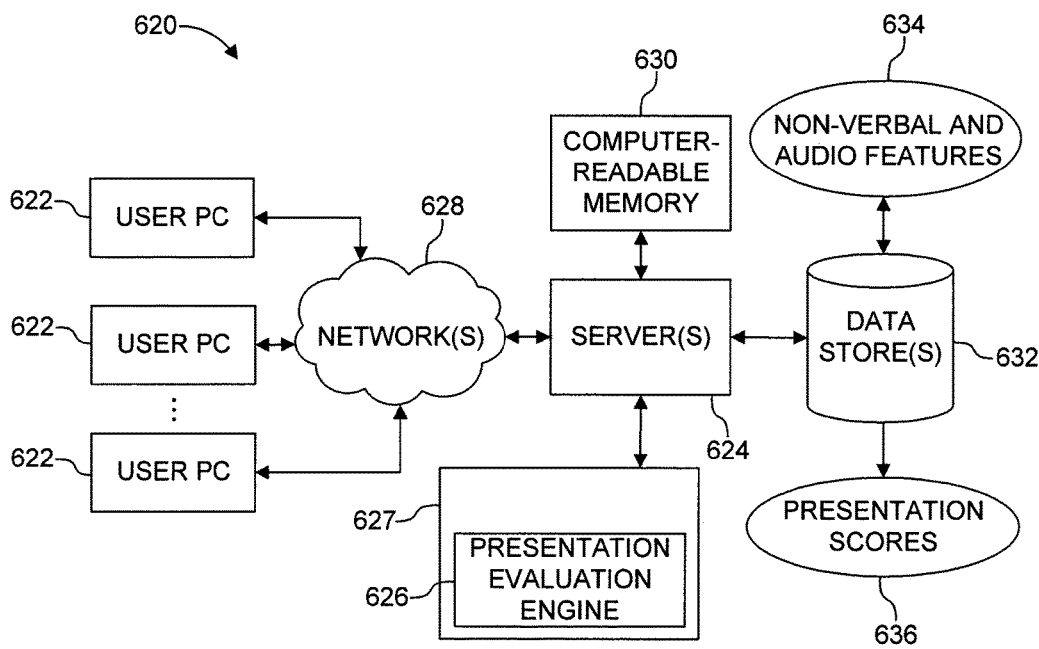
Figure 6C:
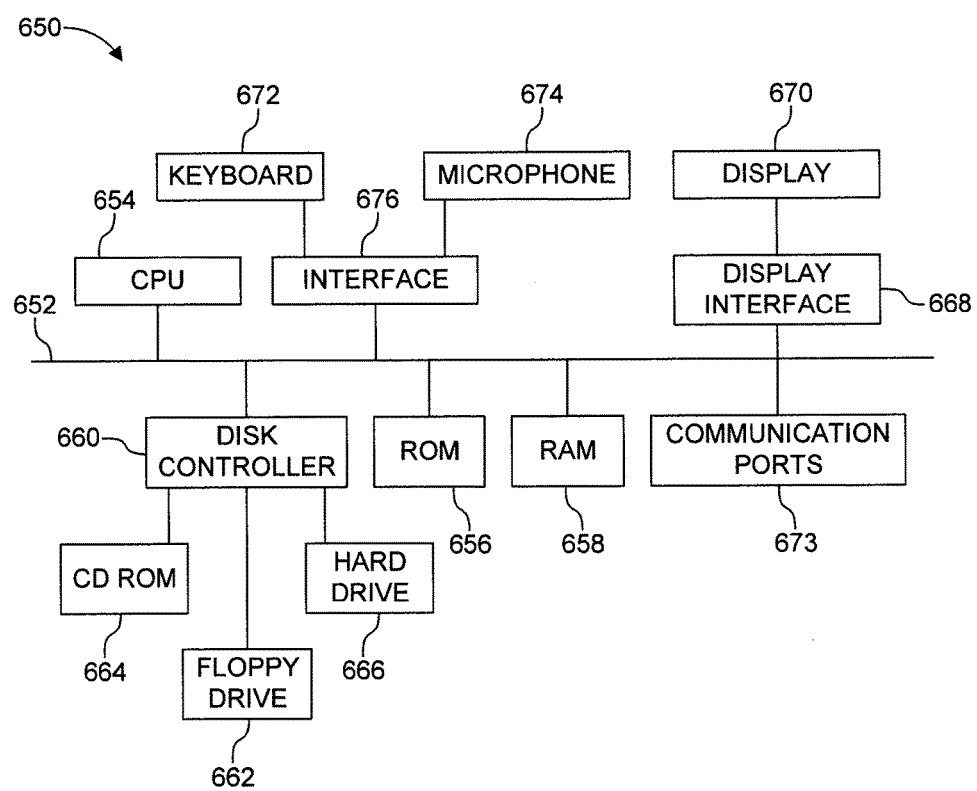

Examples have been used to describe the invention herein, and the scope of the invention may include other examples. FIGS. 6A, 6B, and 6C depict example systems for use in implementing a presentation evaluation engine. For example, FIG. 6A depicts an exemplary system 600 that includes a standalone computer architecture where a processing system 602 (e.g., one or more computer processors located in a given computer or in multiple computers that may be separate and distinct from one another) includes a presentation evaluation engine 604 being executed on it. The processing system 602 has access to a computer-readable memory 606 in addition to one or more data stores 608. The one or more data stores 608 may include non-verbal and audio features 610 as well as presentation scores 612.

FIG. 6B depicts a system 620 that includes a client server architecture. One or more user PCs 622 access one or more servers 624 running a presentation evaluation engine 626 on a processing system 627 via one or more networks 628. The one or more servers 624 may access a computer readable memory 630 as well as one or more data stores 632. The one or more data stores 632 may contain non-verbal and audio features 634 as well as presentation scores 636.

FIG. 6C shows a block diagram of exemplary hardware for a standalone computer architecture 650, such as the architecture depicted in FIG. 6A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a presentation evaluation engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 673.

In addition to the standard computer-type components, the hardware may also include data input devices, such as a keyboard 672, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for providing a multi-modal evaluation of a presentation, comprising:
   a motion capture device configured to generate motion data representing motion of an examinee giving a presentation, the motion data generated by the motion capture device representing three dimensional depth information, motion based on anchor points at respective positions of the examinee, or video frames;
   an audio recording device configured to generate audio data representing audio of the examinee giving the presentation; and
   a processing system configured to:
      generate a plurality of non-verbal metrics of the presentation based on the motion data, the non-verbal metrics selected from the group consisting of a metric of gesticulation, a metric of posture, a metric of eye contact, and a metric of facial expression,
         wherein the metric of gesticulation is generated based on the depth measurements indicating an amount of hand gesturing and based on a magnitude or a rate of pixel value changes between the video frames;
         wherein the metric of posture is generated based on changes in relative distances among the anchor points;
         wherein the metric of eye contact or facial expression is generated based on analysis of the video frames;
      generate a plurality of audio metrics of the presentation based on the audio data, wherein the audio metrics are selected from the group consisting of a content metric, a non-content transcript based metric, and a non-content metric,
         wherein the content metric is generated based on generating a first transcript based on the audio data, and then comparing the first transcript to a model transcript or to a presentation topic prompt;
         wherein the non-content transcript based metric is generated based on the first transcript and comparing sounds produced by the examinee at points in the first transcript to proper pronunciation of words at the points in the first transcript;
         wherein the non-content metric is generated based on one or more of stresses, accents, and discontinuities in the audio data; and
      generate and output a presentation score indicating an evaluation of the presentation based on inputting the non-verbal metrics and the audio metrics to a model comprising weights for a plurality of the non-verbal and audio metrics, the weights being based on correlations between human scores and the non-verbal and audio metrics within a collection of human-scored presentations.

2. The system of claim 1, wherein the motion capture device is a three dimensional depth measurement device or a marker based motion detection device.

3. The system of claim 1, wherein generating the content metric or the non-content transcript based metric includes:
   providing the audio data to an automatic speech recognizer;
   wherein the automatic speech recognizer generates the first transcript based on the audio data.

4. The system of claim 3, wherein the presentation is given based on the presentation topic prompt, wherein the content metric is generated based on content in the presentation being on topic relative to the presentation topic prompt based on the first transcript.

5. The system of claim 3, wherein the automatic speech recognizer further generates the non-content metric based on the audio data;
   wherein the non-content metric comprises a fluency or prosody measurement indicating a quality of speech of the examinee.

6. The method of claim 1, wherein the presentation score is used to automatically determine whether an interviewee is to receive a call back for a second interview.

7. A computer-implemented method of providing a multi-modal evaluation of a presentation, comprising:
   generating motion data representing motion of an examinee giving a presentation using a motion capture device, the motion data representing three dimensional depth information, motion based on anchor points at respective positions of the examinee, or video frames;
   generating audio data representing audio of the examinee giving the presentation using an audio recording device;
   generating a plurality of non-verbal metrics of the presentation based on the motion data, the non-verbal metrics selected from the group consisting of a metric of gesticulation, a metric of posture, a metric of eye contact, and a metric of facial expression,
      wherein the metric of gesticulation is generated based on the depth measurements indicating an amount of hand gesturing and based on a magnitude or a rate of pixel value changes between the video frames;
      wherein the metric of posture is generated based on changes in relative distances among the anchor points;
      wherein the metric of eye contact or facial expression is generated based on analysis of the video frames;
   generating a plurality of audio metrics of the presentation based on the audio data, wherein the audio metrics are selected from the group consisting of a content metric, a non-content transcript based metric, and a non-content metric,
      wherein the content metric is generated based on generating a first transcript based on the audio data, and then comparing the first transcript to a model transcript or to a presentation topic prompt;

wherein the non-content transcript based metric is generated based on the first transcript and comparing sounds produced by the examinee at points in the first transcript to proper pronunciation of words at the points in the first transcript;

wherein the non-content metric is generated based on one or more of stresses, accents, and discontinuities in the audio data; and generating and outputting a presentation score indicating an evaluation of the presentation based on inputting the non-verbal metrics and the audio metrics to a model comprising weights for a plurality of the non-verbal and audio metrics, the weights being based on correlations between human scores and the non-verbal and audio metrics within a collection of human-scored presentations.

8. The method of claim 7, wherein the motion capture device is a three dimensional depth measurement device or a marker based motion detection device.

9. The method of claim 7, wherein generating the content metric or the non-content transcript based metric includes:
providing the audio data to an automatic speech recognizer;
wherein the automatic speech recognizer generates the first transcript based on the audio data.

10. The method of claim 1, wherein the presentation is given based on the presentation topic prompt, wherein the content metric is generated based on content in the presentation being on topic relative to the presentation topic prompt based on the first transcript.

11. The method of claim 9, wherein the automatic speech recognizer further generates the non-content metric based on the audio data;
wherein the non-content metric a fluency or prosody measurement indicating a quality of speech of the examinee.

12. A non-transitory computer-readable medium encoded with instructions for commanding one or more data processors to execute steps for providing a multi-modal evaluation of a presentation, comprising:
generating motion data representing motion of an examinee giving a presentation using a motion capture device, the motion data representing three dimensional depth information, motion based on anchor points at respective positions of the examinee, or video frames;
generating audio data representing audio of the examinee giving the presentation using an audio recording device;
generating a plurality of non-verbal metrics of the presentation based on the motion data, the non-verbal metrics selected from the group consisting of a metric of gesticulation, a metric of posture, a metric of eye contact, and a metric of facial expression,
wherein the metric of gesticulation is generated based on the depth measurements indicating an amount of hand gesturing and based on a magnitude or a rate of pixel value changes between the video frames;
wherein the metric of posture is generated based on changes in relative distances among the anchor points;
wherein the metric of eye contact or facial expression is generated based on analysis of the video frames;
generating a plurality of audio metrics of the presentation based on the audio data, wherein the audio metrics are selected from the group consisting of a content metric, a non-content transcript based metric, and a non-content metric,
wherein the content metric is generated based on generating a first transcript based on the audio data, and then comparing the first transcript to a model transcript or to a presentation topic prompt;
wherein the non-content transcript based metric is generated based on the first transcript and comparing sounds produced by the examinee at points in the first transcript to proper pronunciation of words at the points in the first transcript;
wherein the non-content metric is generated based on one or more of stresses, accents, and discontinuities in the audio data; and
generating and outputting a presentation score indicating an evaluation of the presentation based on inputting the non-verbal metrics and the audio metrics to a model comprising weights for a plurality of the non-verbal and audio metrics, the weights being based on correlations between human scores and the non-verbal and audio metrics within a collection of human-scored presentations.

13. The computer-readable medium of claim 12, wherein the motion capture device is a three dimensional depth measurement device or a marker based motion detection device.

14. The computer-readable medium of claim 12, wherein generating the content metric or the non-content transcript based metric includes:
providing the audio data to an automatic speech recognizer;
wherein the automatic speech recognizer generates the first transcript based on the audio data.

15. The computer-readable medium of claim 14, wherein the presentation is given based on the presentation topic prompt, wherein the content metric is generated based on content in the presentation being on topic relative to the presentation topic prompt based on the first transcript.

16. The computer-readable medium of claim 14, wherein the automatic speech recognizer further generates the non-content metric based on the audio data;
wherein the non-content metric comprises a fluency or prosody measurement indicating a quality of speech of the examinee.

\* \* \* \* \*